United States Patent [19]

Palmert

[11] Patent Number: 4,762,253
[45] Date of Patent: Aug. 9, 1988

[54] FOAM DISPENSING GUN

[75] Inventor: Steven H. Palmert, Brookfield, Wis.

[73] Assignee: RHH Enterprises, Inc., Cudahy, Wis.

[21] Appl. No.: 81,774

[22] Filed: Aug. 5, 1987

Related U.S. Application Data

[63] Continuation-in-part of Ser. No. 015,479, Feb. 17, 1987, abandoned.

[51] Int. Cl.⁴ .................. F23D 11/46; B05B 7/02
[52] U.S. Cl. .................. 222/145; 222/135; 239/414; 239/527
[58] Field of Search ............... 239/414, 432, 526, 527; 222/129, 135-136, 145, 134, 251, 394, 399, 475, 564, 566; 366/177, 340

[56] References Cited

U.S. PATENT DOCUMENTS

| | | | |
|---|---|---|---|
| 3,206,083 | 9/1965 | Nishina | 222/475 X |
| 3,361,412 | 1/1968 | Cole III | 239/432 X |
| 3,399,837 | 9/1968 | Frick | 239/415 |
| 3,784,110 | 1/1974 | Brooks | 239/304 |
| 4,262,847 | 4/1981 | Stitzer et al. | 239/112 X |
| 4,311,254 | 1/1982 | Harding | 222/145 |
| 4,399,930 | 8/1983 | Harding | 222/145 |
| 4,458,831 | 7/1984 | Holleran et al. | 222/134 |
| 4,516,694 | 5/1985 | Finn | 222/148 |
| 4,538,920 | 9/1985 | Drake | 366/177 |
| 4,550,863 | 11/1985 | Farrey | 222/145 |
| 4,676,437 | 6/1987 | Brown | 239/414 |

Primary Examiner—Michael S. Huppert
Attorney, Agent, or Firm—Robert F. Ziems

[57] ABSTRACT

A foam dispensing gun of the type having a disposable nozzle for mixing and dispensing separate fluid components of a resin system in which a single, relatively large diameter cylindrical nipple projecting from the gun body supplies both components to the interior of the mixing nozzle. The nozzle is retained on the gun by a sliding breech which also pivotally supports a valve actuating trigger to be in an operative position when the breech is moved to retain a nozzle to the gun and disabled when the breech is moved to release the nozzle for reloading and by a molded-in ring which makes a fluid tight seal between the nozzle and the single gun body port. The breech includes a stop member so that the trigger actuating forces are isolated from the nozzle.

15 Claims, 4 Drawing Sheets

FOAM DISPENSING GUN

CROSS-REFERENCE TO RELATED APPLICATION

This application is a continuation-in-part of co-pending U.S. application Ser. No. 15,479, filed Feb. 17, 1987 now abandoned.

BACKGROUND OF THE INVENTION

This invention relates to apparatus for mixing and dispensing multi-component fluids and, more particularly, it concerns foam dispensing guns adapted to be used with resin systems in which two or more fluid components, separately stored in pressurized vessels, are mixed and dispensed as settable foam.

U.S. Pat. Nos. 4,311,254 and 4,398,930 issued to Gary Harding on Jan. 19, 1882 and Aug. 23, 1983, respectively, disclose guns for dispensing for urethane foam in which separate fluid components are fed individually to the gun, passed separately through controlled valve ports and brought into contact with each other only upon reaching a mixing chamber of a nozzle from which the mixed components are discharged as foam. Such foam dispensing guns were developed for use with and have been highly successful commercially in prepackaged foam kits which include two pressurized containers of foam forming chemicals or resins, a dispensing gun and other supplies incidental to use of the kit, such as hoses for attaching the gun to the containers, petroleum jelly for facilitating and assuring sealed connections of couplings, solvent for cleaning gun parts, and a plurality of nozzles adapted for easy replacement in the gun. The resins, commonly referred to as the "A resin" and the "B resin" are supplied separately in the two containers and are typically polymeric isocyanate and polyol amine, respectively. When the two fluid components or resins are mixed, the mixture quickly sets up to form a rigid foam product which is substantially insoluble and extremely difficult, if not impossible, to remove from surfaces with which it comes in contact. Because of these characteristics, the nozzles for the gun are designed to be replaceable and disposable in order to avoid the necessity for cleaning any part of the gun which comes into contact with mixed, as distinguished from separate, foam producing fluid components.

It is important that the nozzles are retained on the gun body with relative rigidity, without leakage of fluid components between the gun body and the nozzle, and yet in a manner to facilitate nozzle removal and replacement. It is equally important that the overall design and construction of the gun body and nozzles meet manufacturing cost criteria consistent with disposal of the gun and all other components of the kit when the supplied foam components are spent. In the guns exemplified by the disclosures of the afore-mentioned patents, the nozzles are mounted on the gun body by telescoping a pair of spaced nozzle ports in the nozzle over a pair of similarly spaced conduit pins projecting from the top of the gun body. A breech component slidable on the gun body between positions of nozzle retention and nozzle release in a direction perpendicular to the conduit pins is formed with camming slots for engagement with diametric pins on the exterior of the nozzle. After the nozzle is placed manually on the conduit pins and the breech is moved forcibly from the position of nozzle release to the position of nozzle retention, the nozzle ports are telescoped forcibly along the length of the conduit pins to its loaded position by coaction of the camming slots on the breech and the diametric pins on the nozzle exterior. A valve control trigger is supported pivotally from the breech to be in an operative relationship with gun body carried valve stems and, when operated to discharge foam from a mounted nozzle, develops a force pulling the breech against the nozzle and the conduit pins. The nozzle cannot, therefore, be released from the gun body during foam dispensing operation of the trigger. Release of the nozzle for removal from the gun body is effected by retraction of the breech and an attendant pivoting of the trigger to an inoperative position away from the valve stems, such movement of the breech causing the cam slots therein to lift the nozzle from the conduit pins.

In the guns described in the above-mentioned patents, the conduit pins over which the nozzle ports are telescoped are precision machined metal (typically brass) parts which are threaded into holes in the gun body which, in turn, is molded from a plastic such as polypropylene. A fluid-tight seal between each nozzle port and each pin is accomplished by an internal circumferential sealing rib in each nozzle port having an effective diameter slightly less than the outside diameter of each pin. The nozzles, and thus the sealing rib in each port, are molded of a relatively strong plastic, such as ABS, so that the sealing ribs of the nozzle ports are stressed firmly and stained into sealing engagement with the machined brass conduit pins on the gun body as the nozzle is forced to its mounted position on the gun body.

Because the conduit pins function to hold the nozzle against movement in reaction to manually forced sliding movement of the breech during nozzle loading and unloading operations and also react to trigger actuating forces, the structural requirements of the conduit pins to withstand the forces to which they are subjected has resulted in small diameter fluid passageways throughout the length of both conduit pins. Early in the commercial development of the guns of the described design, it was recognized that the required relatively small diameter fluid passageways of the conduit pins and the substantial length of those passageways resulted in blockage particularly of the conduit pin through which the "A resin" component or isocyanate was passed. Such blockage was due to the tendency for the isocyanate component to set up or crystalize on contact with air. This problem was solved by adding a solvent flushing port to the "A resin" side of the gun body in accordance with the disclosure of U.S. Pat. No. 4,516,694 issued to Clifford J. Finn on May 14, 1985.

In addition to the conduit pin blockage problem, problems have been encountered more recently with leakage between the conduit pins and the sealing ribs in the plastic nozzle ports. Such leakage is believed to be the result of difficulty in maintaining adequately close dimensional tolerances in machining the exterior cylindrical surfaces of the conduit pins, in the molding of the nozzle port sealing ribs, or in both of these manufacturing procedures. Also the relative incompressibility of the brass pins is believed to have caused fracture points in the plastic ribs in some instances to cause the unwanted leakage. In addition, the manner of mounting the nozzles and the resulting resolution of trigger actuating forces at the nozzle port/conduit pin seals is believed to have contributed to the leakage problem.

While the foam dispensing gun designs represented by the mentioned U.S. patents have proven to be highly effective and commercially successful in a very competitive market, there is need for improvement particularly in the fluid coupling of nozzle/gun passageways and in the arrangement for mounting and removing nozzles from the gun body.

SUMMARY OF THE INVENTION

In accordance with the present invention, the problems associated with prior gun designs of the type described are substantially alleviated by the provision of a relatively large diameter, single conduit formation projecting from the gun body to be received in and seal with the inside of a single inlet port formed in the replaceable nozzles. In this way, the engaging parts of both the gun body and the nozzles are formed exclusively of molded plastic materials. Accordingly, the foam dispensing gun of the present invention is less costly, easier to use, and able to use a highly effective, leak proof, nozzle-to-gun fluid coupling which does not restrict fluid component flow from gun mounted control valves to the replaceable mixing and dispensing nozzle.

In a preferred embodiment, the gun body is molded in one piece with the handle from polypropylene or other plastic material having the physical characteristics of polypropylene to include a single upstanding cylindrical nipple port opening directly through a pair of component ports to the outlets of two valves for controlling flow of the two foam generating resin components. The replaceable nozzles are each molded from a relatively hard plastic, such as ABS, to define a single inlet port sleeve having an inside diameter slightly larger than the outside diameter of the gun body nipple port. The inside of the nozzle inlet port sleeve is formed with an internal circumferential rib of an effective diameter smaller that the outside diameter of the body port nipple so that when the nozzle inlet port sleeve is telescoped over and forcibly pressed onto the body port nipple, a combination of the respective plastic materials from which the nozzles and gun body are molded together with this relative dimensioning results in the body port nipple being compressed by the nozzle inlet port sealing rib to assure a tight, leak proof seal. While the valves, breech and trigger organization of prior designs are generally retained, the breech is modified to provide a passive retention of a nozzle mounted on the gun body without resolution of trigger operating forces in the nozzle. Nozzle removal is facilitated by the provision of pull tabs on the nozzle exterior to enable nozzle separation from the gun body by a direct manually exerted pulling force.

A principal object of the present invention is therefore, the provision of an improved foam dispensing gun of the type adapted for use with disposable nozzles, which is highly effective in operation, and which is capable of low-cost manufacture using a minimal number of easily formed and assembled components.

Other objects, features, advantages and further scope of applicability of the present invention will become apparent from the detailed description to follow, taken in conjunction with the accompanying drawings in which like parts are designated by like reference characters.

DETAILED DESCRIPTION OF THE PREFERRED EMBODIMENTS

Figure 1:
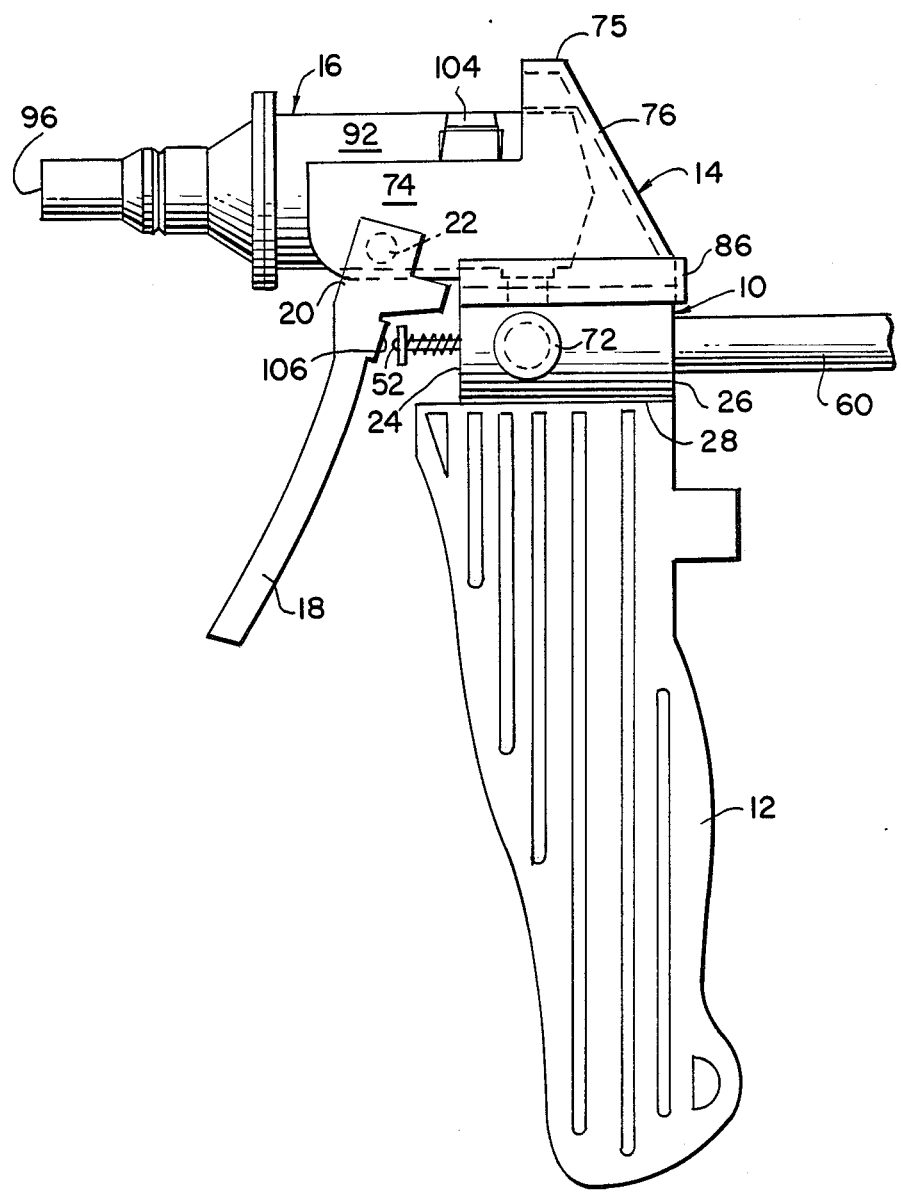
FIG. 1 is a side view illustrating an assembled foam dispensing gun in accordance with the present invention.
Figure 2:
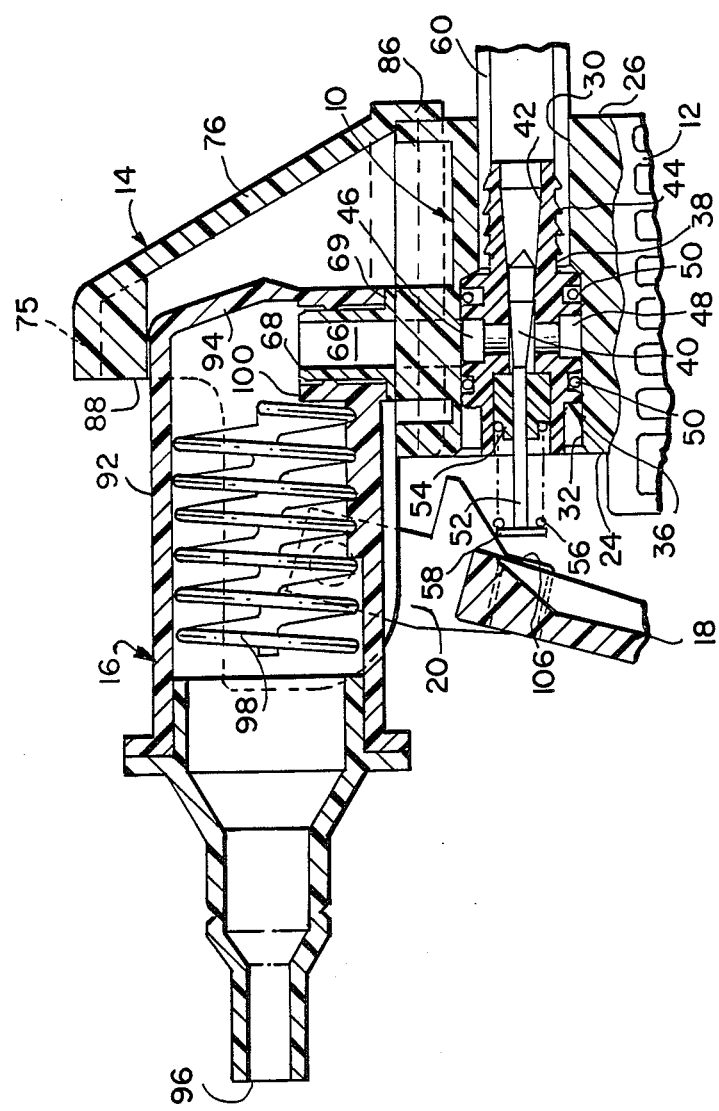
FIG. 2 is an enlarged, fragmentary cross section on a longitudinal central plane of the breech and disposable nozzle and on a laterally displaced plane through the center of one of the valve stems and valve ports.

In FIG. 1 of the drawings, an embodiment of the foam dispensing gun of the present invention is shown to include a gun body 10 and a handle 12 to which the gun body 10 is securely fixed preferably as an integral or one-part molded component. Other suitable means (not shown), such as interlocking dove-tail formations, bonding, threaded fasteners or the like may also be used to secure the body 10 to the handle 12. The gun body 10 supports a slidable breech 14 and a disposable mixing nozzle 16. The breech 14 supports a depending trigger 18 having a yoke 20 at its upper end for pivotal attachment to the sliding breech 14 by a pair of studs 22 Although the structure of each of the components as well as the manner in which they cooperate during operation of the gun will be described in more detail below, it will be noted here that the gun body 10, the handle 12, the sliding breech 14 and the trigger 18 are unitary components formed of suitable synthetic resinous or plastic material shaped by injection molding techniques. While the specific material of the breech 14 and of the trigger 18 is not important to the present invention, it is preferred that the gun body 10 and nozzle 16 be molded from polypropylene and ABS, respectively or from plastic materials having the relative physical characteristics as polypropylene and ABS for reasons to be explained more fully hereinafter. The gun body 10, as shown in FIGS. 1-4, is shaped externally to provide a front surface 24 and a rear surface 26 (FIGS. 1 and 2). A lower or base portion 28 (FIG. 4) is necked down to join with the top of the handle 12. Extending longitudinally through the body 10 are a pair of bores 30 and counter bores 32 (FIG. 2). The bores open at the rear surface 26 while the counter bores open at the front surface 24 and define with the bores 30 annular ledges 34. Received within each of the counter bores 32 is a valve assembly 36 including a generally cylindrical valve body 38 and a valve needle 40. The valve body 38 defines a rearwardly diverging tapered seat 42 against which the valve needle 40 seats to prevent passage of fluid in a direction from a barbed nipple portion 44 of the valve body through the seat 42 to radial valve discharge ports 46. The ports 46 open to a circular recess or discharge manifold 48 defined in part by the counter bore 32 and located between a pair of O-ring seals 50 acting between the valve body 38 and the counter bore 32.

The valve needle 40 for each assembly 36 includes a stem 52 supported for axial movement in the valve body by an annular bushing 54. A valve seating spring 56 acts in compression between a press nut 58 at the outer end of the stem 52 and the bushing 54. Thus, in the absence of any external force, the valve needle 40 will be biased against the seat 42 to a closed condition by the spring 56.

The barbed nipple portion 44 of each of the valve bodies 38 extends within one of two hoses 60 and 62 which connect the gun body 10 in fluid communication with separate sources of foam producing fluid components (not shown). The outside diameter of the hoses 60 and 62 is selected to fit slidably within the bores 30. The external diameter of the barbed nipple 44 is selected to fit within each of the hoses 60 and 62 in a manner such that insertion of the valve body rearwardly of the gun body will result in the ends of the hoses 60 and 62 being seized between the barbed nipple 44 of the valve body 38 and the bores 30. Also, the hoses are placed under a radial compression force by such insertion of the barbed nipples 44 that the resulting friction between the hoses and the bores 30 is adequate to secure the assemblies of the valves and hoses against displacement relative to the gun body.

From the foregoing, it will be seen that the hoses 60 and 62 together with the two valve assemblies 36 establish separate and controlled fluid passageways for each of two resin components supplied to the gun body 10 for discharge as a foam product. As shown most clearly in FIGS. 2 and 4 of the drawings, when the valve needles 40 of the two valve assemblies 36 are displaced from their respective valve seats 42 to an open position, fluid components will flow from the hoses 60 and 62 around the valve needles 40, through the radial ports 46 in the valve bodies to the manifolds 48 of the respective valve assemblies 36.

Figure 4A:
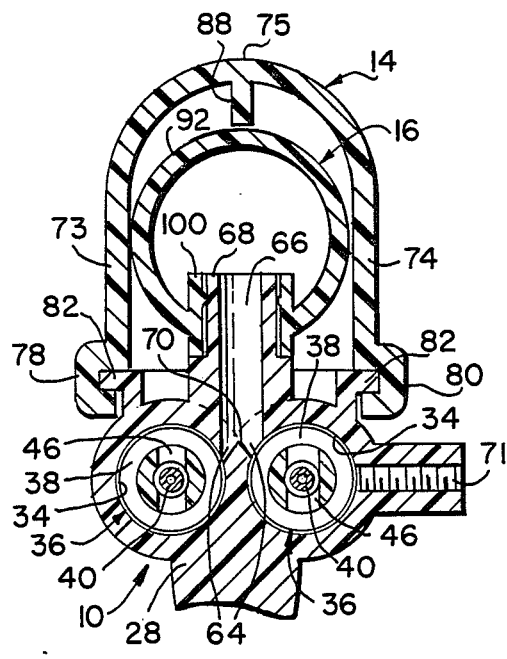
FIG. 4A is a cross section on line 4—4 of FIG. 3 but with a nozzle mounted on the gun body.

Prior urethane foam dispensing gun designs were based on the assumption that the separate fluid passageways for each of the two components of the urethane foam system were required to extend beyond the control valves and into the replaceable nozzle where they became mixed and dispensed as foam. In accordance with an embodiment of the present invention shown in FIG. 4A, however, the valve manifolds 38 open directly through semicircular ports 64 to a single relatively large diameter gun body discharge port 66 defined by a cylindrical nipple 68 upstanding from the top of the gun body 10, the upper portion of which is of reduced outside diameter to establish an upwardly facing annular stop ledge 69. The semicircular ports 64 in FIG. 4A are separated by a relatively short angular or tapered wall portion 70 at the base of the port 66 adequate to prevent direct passage of a fluid component supplied by one of the two hoses 60 and 62 into the valve manifold of the other fluid component in the event of a combined pressure differential in the supply hoses 60 and 62 and an adequate resistance to flow upwardly through the single port 66. Also it will be noted that the gun body nipple 68 is molded as an integral extension of the gun body 10 and is, therefore, of the same material as the gun body 10.

Figure 4B:
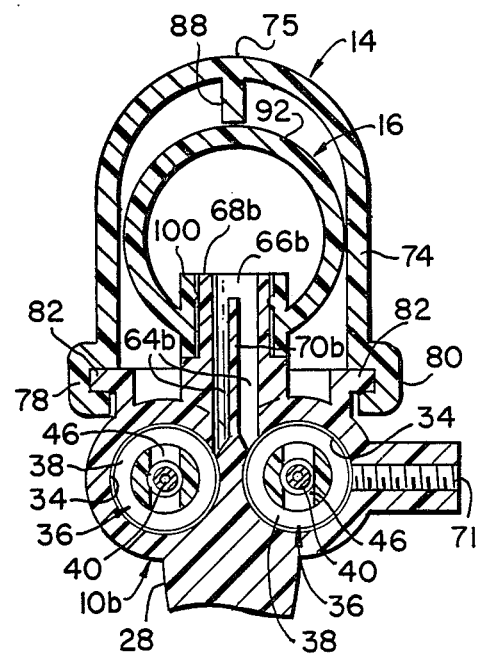
FIG. 4B is a cross section similar to FIG. 4A but illustrating an alternative embodiment of the invention.

In FIG. 4B, an alternative and preferred embodiment of the invention is shown in which parts identical to parts shown in FIG. 4A are designated by the same reference characters whereas parts corresponding to parts in FIG. 4A, but modified, are designated by the same reference numerals and a "b" suffix. Thus in FIG. 4B, the ports 64 of the embodiment of FIG. 4A are extended as passageways 64b of semicircular cross section for a substantial portion of the interior length of the cylindrical nipple 68b by extending the wall 70 upwardly as a thin diametric wall or baffle 70b. As in the embodiment of FIG. 4A, the ports 64b join in a single passageway 66b but which extends for only a short distance between the top of the baffle 70b and the top of the nipple 68b.

A principal advantage of the embodiment of FIG. 4B is that while the relatively large effective cross-sectional area of each of the separate ports 64 is essentially retained in the elongated ports 64b, the problems associated with cross-over of one resin component into the control valve of the other are greatly reduced. Also, the quantity of flushing solvent needed to cleanse the passageway extending from the solvent port 71, in a manner to be described below, is reduced substantially.

Figure 3:
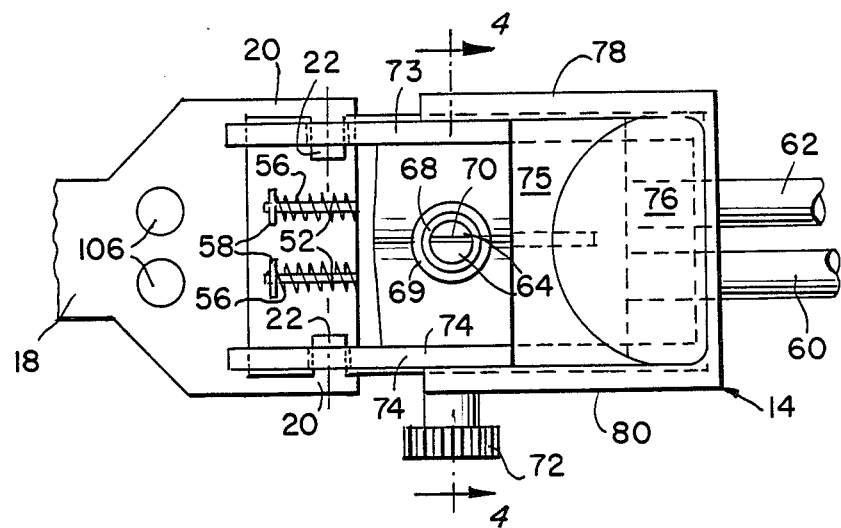
FIG. 3 is a top view of the breech component, the gun body, and the trigger in accordance with the invention.

Also and as shown generally in FIGS. 1 and 3 but more completely in FIG. 4 of the drawings, the side of the gun body 10 on which the supply hose 60 is located is provided with a solvent flushing port 71 (FIG. 4) normally closed by a threaded screw cap 72 (FIGS. 1 and 3). The port 71 opens at its inner end to the manifold 38 of the valve assembly 36 controlling flow from the hose 60. As fully disclosed in the previously cited U.S. Pat. No. 4,516,694, the organization of the solvent flushing port 71 as shown in the drawing presumes that the hose 60 will supply the "A resin" or isocyanate component to the port 66. While the organization of the solvent port 71 is essentially the same as that disclosed in the aforementioned patent, the provision of the single gun body discharge port 66 and the manner in which it communicates with the manifolds 38 of both valve assemblies as shown in FIG. 4A, enables introduction of solvent port downwardly through the port 66 to flush the manifolds 38 of both valve assemblies 36 for discharge of the solvent out through the port 71. Alternatively, as in the embodiment of FIG. 4B, the solvent may be introduced through the port 71 for cleansing the "A resin" valve assembly 36, the length of the elongated port 64b on the side of the port 71 and the common discharge port 66.

The breech 14, as indicated, is a one piece plastic molding shaped to establish a pair of laterally spaced vertical wall portions 73 and 74 joined by transverse top and rear wall formations 75 and 76, respectively. These latter transverse walls extend from the rear of the breech 14 only partially along its length thus permitting the substantial forward portions of the walls 73 and 74 to project in opened spaced relationship. At the bottom of each of the side walls 73 and 74 are channel-shaped ways 78 and 80, respectively, adapted to receive one of a pair of complementing inverted L-shaped rails 82 formed in the top surface of the gun body 10 as shown in FIG. 4. To facilitate assembly of the breech 14 with the body 10, the rails 82 continue through the rear surface 26 of the gun body 10. After the ways 78 and 80 of the breech 14 are slid forwardly over the rails 82, the trigger pivoting studs 22 are inserted into the holes 66. A bottom wall formation 86 extends transversely across the rear of the breech between the channel-shaped ways 78 and 80 and provides a rear stop for limiting forward sliding movement of the breech 14 relative to the gun body 10 significantly beyond the position illustrated in FIG. 1 of the drawings. A nozzle retention rib 88, depending from the top center of the breech 14, is located above the body port nipple 37 in this position. Rearward movement of the breech is restricted by the stop lug surface 90 of the trigger 18 which engages the front surface 24 of the gun body 10.

The nozzle 16, as shown most clearly in FIGS. 2 and 4-6 of the drawings, is similar to the nozzles disclosed in the above-mentioned Harding patents to the extent that it includes a generally cylindrical outer shell 92 closed at its rear end by a flat conical wall 94 and opening forwardly to a concentric axial discharge opening 96. An internal spiral mixer 98 extends throughout the major diameter portion of the shell 92 also in a manner known in the prior art. In accordance with the present invention, however, the nozzle shell 92 includes a single nozzle inlet port sleeve 100 projecting radially from the shell 92 near the rear wall 94 thereof. While both the inner and outer surfaces of the sleeve 100 are essentially smooth and cylindrical, the inner sleeve surface is formed with an inwardly directed, circumferential sealing rib 102 near the inner end of the sleeve.

Figure 5:
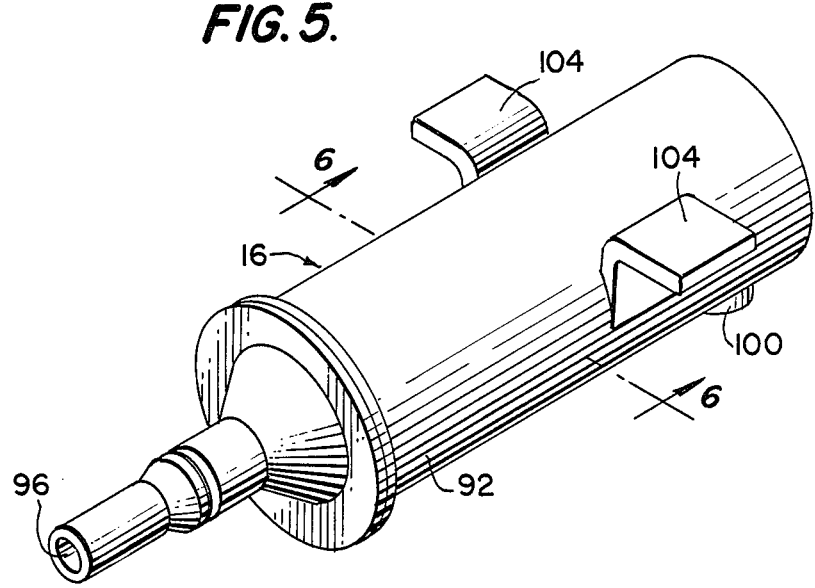
FIG. 5 is a perspective view of a preferred embodiment of a disposable nozzle in accordance with the invention.
Figure 6:
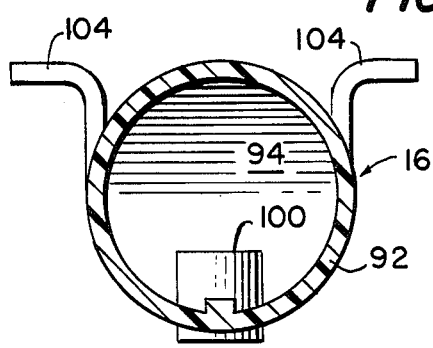
FIG. 6 is a cross section on line 6—6 of FIG. 5.

As shown most clearly in FIGS. 1, 5 and 6 of the drawings, a pair of gripping appendages or finger tabs 104 are provided on the exterior of the shell 92 on the side thereof diametrically opposite from the inlet port sleeve 100. The finger tabs are located lengthwise of the shell 92 to be forward from the rear wall 94 but only slightly forward of the sleeve 100. As will be understood from the illustration in FIGS. 5 and 6, the tabs 104 are positioned and shaped to facilitate gripping with two fingers in a manner to enable a manual pulling force to be applied to the nozzle in a radial direction opposite from the radial direction the sleeve 100 projects from the shell 92.

Figure 7:
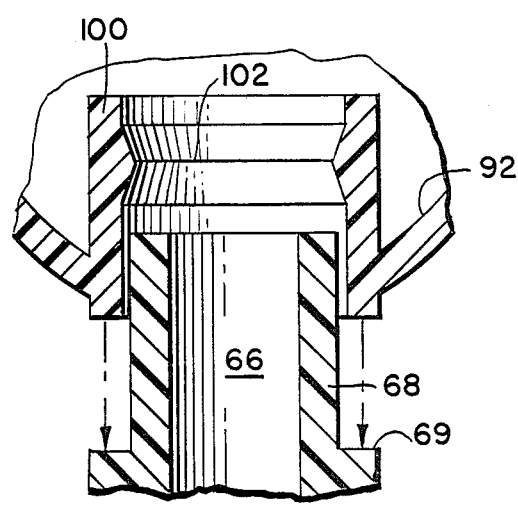
FIG. 7 is an enlarged fragmentary cross-section showing nozzle/gun body fluid coupling components.

To assemble or load the nozzle 16 into an operative position, the breech 14 is slid rearwardly to a nozzle release position as shown in FIG. 3 of the drawings. In this position of the breech, the nozzle 16 may be placed so that the nozzle inlet port sleeve 100 fits over the gun body port nipple 68 as depicted generally in FIG. 7. The final mounting position of the nozzle 16 on the gun body 10 is achieved by manually pressing the rear top of the nozzle to force the sealing rib 102 in the sleeve over the outer cylindrical surface of the body port nipple 68 until the bottom edge of the sleeve 100 engages the stop ledge 69 on the body nipple 68. The relatively hard material from which the nozzle 16 is formed will result in a fluid tight sealing of the rib about the outer surface of the relatively softer material of the body port nipple 68. A forward movement of the breech from the position shown in FIG. 3 will result in the positioning of the nozzle retention member 88 over top of the nozzle 16 in a location above the nozzle inlet port sleeve 100 and the gun body port nipple 68. Upon continued forward movement of the breech 14 from the position shown in FIG. 3 to a nozzle retention position as shown in FIG. 1, the bottom wall formation 86 will contact the rear surface 26 of the gun body 10 without any portion of the breech 14 bearing against the mounted nozzle 16. To remove a nozzle 16 from the gun, the breech 14 is moved rearwardly to the position shown in FIG. 3 and the tabs 104 on the nozzle 16 are grasped and pulled upwardly to disengage the nozzle inlet port sleeve 100 from the gun body port nipple 68.

With reference again to FIGS. 1 and 2 of the drawings, it will be noted that the trigger 18 carries suitable valve stem engaging means such as a pair of set screws 106 in a position to engage the ends of the valve stems 52 when the breech 14 is positioned to retain a nozzle 16 or in the position illustrated in FIG. 1. In this condition, it will be appreciated that one grasping the handle 12 and squeezing the trigger 18 will cause the valve stems to move the needles 40 from the valve seats 42. Fluid components under pressure and supplied through the hoses 60 and 62 will pass simultaneously through the respective valve outlet ports 64 through the gun port 66 and into the nozzle 16 where the fluid components are fully mixed and discharged as foam through the discharge orifice 96 on the front end of nozzle 16. Also, it will be appreciated that by varying the extent to which the trigger 18 is moved toward the handle 12, the rate of foam discharge from the nozzle orifice 96 may be regulated.

The foam dispensing gun of the present invention, as thus described and illustrated, both preserves the desirable characteristics of commercially proven guns in the prior art as exemplified by the cited Harding and Finn patents and moreover incorporates several additional and unexpected advantages resulting principally from the use of a single, relatively large diameter discharge port nipple 68 on the gun body. In the context of preserving known desirable characteristics, the organization of the breech 14 and the pivotal mount of the trigger 18 therefrom to assure that the nozzle 16 cannot be removed from the gun during discharge of foam through the nozzle 16 is the same as the prior designs. Moreover, the protective shroud represented by the side and top walls of the breech functions to divert discharge of materials away from the operator in the event of accidental discharge of component materials from the gun body with no nozzle in place. The gun of the present invention also retains the metering capability of the valve assemblies 36 and the facility offered for valve adjustment by virtue of the set screws 106 to vary the discharge rate of the respective valve assemblies.

The provision of the discharge ports 64,64b on the gun body with relatively large cross-sectional areas is significant from the standpoint of reducing, if not eliminating, any restriction to fluid flow on the downstream sides of the valve seats 42. This feature is important not only to relatively low viscosity urethane foam components but provides for the first time in a low priced foam dispensing gun, a capability for handling relatively heavy viscosity phenolic foams which are especially desirable for their very low flammability. In addition, the provision of a single discharge port nipple on the gun body enables a highly effective and leak-proof seal between the gun body and the nozzle. Moreover, the passive nature of the breech retention of the nozzle, that is, the provision of a stop preventing removal of the nozzle without in any way placing undesirable forces on the nozzle-to-gun nipple connection contributes significantly to the permanence of the leak proof seal while a nozzle is mounted on the gun body.

It has been found by experimentation that the residual mixture of fluid components remaining in the gun body port 66 after the removal of a nozzle does not result in an immediate blockage of the port 66. Apparently, because the two components are not thoroughly mixed in the port, they do not react with each other to form foam in the gun mounted nozzle port 66. Instead, they remain in the nozzle as a gelatinous fluid for as long as a day or more and, as such, are discharged under the pressure of the fluid components in the hoses 62 when a new nozzle is placed on the gun nipple 68 and the gun operated.

Where a nozzle is removed and the gun having the nipple design shown in FIG. 4A is left unattended for longer periods of time such as a week or so, the resins remaining in the relatively long single port 66 can solidify as an annulus and thus reduce the effective diameter of the gun body port 66. This situation, of course, can be avoided very easily by using the solvent purge port 71 and flushing particularly the "A resin" or isocyanate from the port 66. In addition, and if the gun is to be left for periods of time longer than one week, the provision of the relatively large single port 66 enables all gun component surfaces which have been contacted by both resins to be flushed thoroughly by introducing the solvent into the port 66 and allowing it to flow out through the solvent flushing port 71. Similar results can be achieved by blocking the outlet of the body port 66 to insure passage of solvent introduced into the port 71 throughout the manifolds of both valve assemblies 36. After this type of flushing, all parts can be left relatively clean for an indefinite period of time before subsequent use by placing another nozzle on the gun body 10.

Thus, it will be appreciated that as a result of the present invention, a highly effective foam dispensing gun is provided. It is contemplated and believed to be apparent to those skilled in the art from the preceding description that modification and/or changes may be made in the disclosed embodiment without departure from the present invention. Accordingly, it is expressly intended that the foregoing description is illustrative of a preferred embodiment only, not limiting, and that the true spirit and scope of the present invention be determined by reference to the appended claims.

I claim:

1. In a foam dispensing gun having a pair of supply conduits adapted to be connected to separate pressurized fluid components to be mixed and dispensed from the gun, a gun body having a pair of fluid passageways adapted to be connected to the respective supply conduits, valve means for controlling the flow of fluid components through said passageways, a replaceable mixing and dispensing nozzle adapted to be mounted on said body, means for removably retaining said nozzle on said body, and trigger means for operating said valve means, the improvement comprising:
   a cylindrical nipple projecting from said body to provide body discharge porting for both said fluid components;
   means including a cylindrical sleeve provided on and extending within said nozzle for defining a single inlet port in said nozzle, said sleeve being adapted to telescope over said nipple to provide releasable coupling passageway between said discharge porting and said inlet port; and
   sealing means operable between said sleeve and said nipple for making said coupling passageway fluid tight.

2. The foam dispensing gun recited in claim 1 wherein said sealing means comprises a circumferential sealing rib on one of said sleeve and said nipple and operable between the inside of said sleeve and the outside of said nipple.

3. The foam dispensing gun recited in claim 1 wherein said sealing rib is on the inside of said sleeve.

4. The foam dispensing gun recited in claim 2 wherein the one of said sleeve and said nipple including said sealing rib is of a material which is hard relative to the material of the other of said sleeve and said nipple and wherein the effective diameter of said sealing rib is selected to deform the material of the other of said sleeve and said nipple when said nozzle is mounted on said body.

5. The foam dispensing gun recited in claim 3 wherein said sleeve is molded of a plastic material having the physical characteristics of ABS and wherein said nipple is molded of a plastic material having the physical characteristics of polypropylene.

6. The foam dispensing gun recited in claim wherein said sealing rib is isolated from forces acting on said means fo retaining said nozzle on said body B during operation of the gun.

7. The foam dispensing gun recited in claim wherein said means for retaining said nozzle on said body comprises a breech slidable on said body between nozzle retaining and nozzle releasing positions and having a nozzle retaining stop positioned opposite said nozzle from said sleeve.

8. The foam dispensing gun recited in claim wherein said trigger means is pivotally supported from said breech and imposes a force on said breech holding it in said nozzle retaining position, said breech having stop means engageable with said body to resist said force without stressing said sealing rib.

9. The foam dispensing gun recited in claim 1 wherein said nozzle includes external finger tabs to facilitate manual removal of said nozzle from said gun body.

10. The foam dispensing gun recited in claim 1 wherein said nipple comprises a common discharge port for both of said fluid components.

11. The foam dispensing gun recited in claim 10 wherein said common discharge port extends throughout the length of said nipple from said valve means to the projecting end of said nipple.

12. The foam dispensing gun recited in claim 70 comprising means defining a solvent flushing port on said body, said flushing port opening through at least one of said valve means to said common discharge port.

13. The foam dispensing gun recited in claim 1 wherein said nipple includes an internal diametric partition wall to provide separate discharge ports for each of said fluid components for a major portion of the length of said nipple.

14. The foam dispensing gun recited in claim artition wall extends from said valve means at the base of said nipple to a point short of the projecting end of said nipple, thereby to provide a common discharge port for both said fluid components at the projecting end of said nipple.

15. The foam dispensing gun recited in claim 13 comprising means defining a solvent flushing port on said body, said flushing port opening through at least one of said valve means and one of said separate discharge port.

* * * * *

UNITED STATES PATENT AND TRADEMARK OFFICE
CERTIFICATE OF CORRECTION

PATENT NO. : 4,762,253

DATED : August 9, 1988

INVENTOR(S) : Steven H. Palmert

It is certified that error appears in the above-identified patent and that said Letters Patent is hereby corrected as shown below:

```
Claim 3, line 1, change "claim 1" to --claim 2--.
Claim 6, line 1, after "claim" insert --2--;
         line 3, change "fo" to --for--; and
         line 3, delete "B".
Claim 7, line 1, after "claim" insert --6--.
Claim 8, line 1, after "claim" insert --7--.
Claim 12, line 1, change "claim 70" to --claim 10--.
Claim 14, line 1, after "claim" insert --13 wherein
         said diametric partition--; and
         line 1, delete "artition".
```

Signed and Sealed this

Thirteenth Day of December, 1988

Attest:

DONALD J. QUIGG

*Attesting Officer*      *Commissioner of Patents and Trademarks*